United States Patent [19]
Alteepping et al.

[11] Patent Number: 4,940,736
[45] Date of Patent: Jul. 10, 1990

[54] PRODUCTION OF LOW DENSITY POLYPROPYLENE FOAM

[75] Inventors: Josef Alteepping, Ochtrup, Fed. Rep. of Germany; Juergen P. Nebe, Naperville, Ill.

[73] Assignee: Amoco Corporation, Chicago, Ill.

[21] Appl. No.: 243,831

[22] Filed: Sep. 12, 1988

[51] Int. Cl.$^5$ ............................................. C08J 9/14
[52] U.S. Cl. ..................................... 521/98; 521/79; 521/81; 521/134; 521/143; 521/910; 525/240
[58] Field of Search ................... 521/134, 143, 79, 81, 521/910; 525/240

[56] References Cited
U.S. PATENT DOCUMENTS 3,607,796  9/1971  Eberle et al. ..................... 521/134
3,846,349  11/1974  Harada et al. ..................... 521/134

Primary Examiner—Morton Foelak
Attorney, Agent, or Firm—William E. Murray; William H. Magidson; Ralph C. Medhurst

[57] ABSTRACT

A method of producing a foamed product having a density less than 0.2 g/cm$^3$, which comprises foaming a composition comprising a major proportion of a low viscosity polypropylene component having a melt viscosity (at 190° C. and a shear rate of 1000 sec$^{-1}$) of less than $2 \times 10^3$ poise and a minor proportion of a high viscosity polypropylene component having a melt viscosity (at 190° C. and a shear rate of 1000 sec$^{-1}$) of greater than $2.5 \times 10^3$ poise.

25 Claims, No Drawings

PRODUCTION OF LOW DENSITY POLYPROPYLENE FOAM

BACKGROUND OF THE INVENTION

This invention relates to a method of producing low density polypropylene foam.

Foamed plastics find numerous industrial applications including uses as heat insulating and sound deadening materials, as packaging materials, as upholstery materials and as structural elements in, for example, resilient panels for automobile interiors.

The increase in the price of plastics has spurred the development of inexpensive foamed plastics materials to reduce costs and also to provide better functional characteristics than with current materials. For some time now, polyethylene foam has been produced by extrusion processes in which foam formation is effected chemically or physically. In "chemical" foaming procedures, the gas required to cause foaming is produced by chemical reaction between foaming reagents, whereas in "physical" foaming procedures, the gas required to cause foaming may be injected or the gas may be produced by conversion to the gaseous state of a low boiling point liquid.

The advantages of polyethylene foam include good temperature stability and high chemical resistance, as well as the possibility of thermoplastic processing for special applications (foam laminating, thermomolding, etc.).

The properties of polypropylene have led several researchers to investigate its use in the manufacture of foamed materials. Thus applications of foamed polypropylene are envisaged to be found in the building and automotive industries where good heat insulation, sound deadening and higher end use temperatures are of particular interest. Such uses would take advantage of polypropylene's known properties of good chemical resistance, high resilience and relatively low cost when compared to, for example, polystyrene and polyurethane.

Until now the majority of polyolefin foams available have been made from polyethylene because the process of foaming polyethylene is considerably easier than foaming polypropylene. Furthermore, previously proposed procedures for foaming polypropylene have suffered from severe disadvantages limiting their commercial application.

For example U.S. Pat. No. 4,352,892 (Firma Carl Freudenberg) discloses a process for foaming a composition comprising crystalline polypropylene and a further component selected from polybutadiene, ethylene vinyl acetate copolymer and ethylene-propylene terpolymer rubbers. Foaming is carried out in the presence of a radical former and a radical decomposition initiator and the resulting foam is crosslinked by means of high energy radiation.

U.S. Pat. No. 4,442,232, also to Freudenberg, similarly foams a composition comprising crystalline polypropylene and polybutadiene and achieves cross-linking by including a peroxide cross-linking agent and subjecting the foam to high energy radiation.

U.S. Pat. No. 4,298,706 (Karengafuchi Dagaku Kogyo KK) discloses a process for producing foams from compositions comprising polypropylene and polybutadiene which are kneaded together at an elevated temperature so as to undergo thermal reaction and form a hot xylene insoluble content of at least 2% by weight.

U.S. Pat. No. 3,846,349 (Sumitomo Chemical Co.) describes a process for producing foam from a three component mixture of crystalline polypropylene, non-crystalline propylene and low density polyethylene. The resulting compositions were foamed at foaming ratios of 1.1 to 2.0. Similarly the foamed products described in U.S. 3,876,494 (Sumitomo Chemical Co.) were all produced at foaming ratios in the range from 1.2 to 2.0.

U.S. Pat. No. 3,607,796 (Grunzweig and Hartmann AG) describes a process for producing foam from a composition comprising high and low molecular weight polypropylene polymers. The resulting foams all had densities in excess of 0.2 g/cm$^3$ The prior art procedures described hitherto have thus all suffered from the disadvantage of either requiring the use of chemical and/or physical procedures for cross-linking the polypropylene component of the foam or failure to produce stable foam of sufficiently low density.

SUMMARY OF THE INVENTION

A method of producing a foamed product having a density less than 0.2 g/cm$^3$, which comprises foaming a composition comprising a major proportion of a low viscosity polypropylene component having a melt viscosity (at 190° C. and a shear rate of 1000 sec$^{-1}$) of less than $2 \times 10^3$ poise and a minor proportion of a high viscosity polypropylene component having a melt viscosity (at 190° C. and a shear rate of 1000 sec$^{-1}$) of greater than $2.5 \times 10^3$ poise.

BRIEF DESCRIPTION OF THE INVENTION

A method has now been developed for producing polypropylene foam of low density (less than 0.2 g/cm$^3$) by foam extrusion without the use of chemical cross-linking agents or radiation-based curing procedures. Instead, the invention relies on selection of specific components of the foaming composition to achieve a stable, low density foam having excellent foam structure and mechanical properties.

Typical compositions for foaming in accordance with the invention contain from 70 to 90 weight per cent of a low viscosity polypropylene component and from 30 to 10 weight per cent of a high viscosity polypropylene component, based on the total weight of said components.

Trials have demonstrated that selection of suitable low and high viscosity components and their relative proportions is important in obtaining high quality foams. For example, it has been observed that omission of the high viscosity component results in failure to produce a stable foam as it is not possible to build up sufficient pressure in the extrusion line. Further, use of components having an excessively large molecular weight distribution or dispersivity can result in poor foaming (e.g. foam collapse, excessive density, irregular pore size and voids).

The viscosities of the low and high viscosity components are generally dependent upon molecular weight. Thus the weight average molecular weight of the low viscosity component is preferably in the range from 100,000 to 500,000, most preferably 200,000 to 350,000 and the weight average molecular weight of the high viscosity component is preferably greater than 500,000, most preferably in the range 1,000,000 to 2,000,000.

As used herein, the term "dispersivity" (also referred to as "molecular weight distribution") means the the ratio between the weight average molecular weight ($\overline{MHD}$ w) and the number average molecular weight ($\overline{MHD}$ n).

In order to produce stable foams having a particularly regular pore structure the dispersivity of at least one of the low and high viscosity components should be low, e.g. less than 5 and most preferably from 2 to 5.

Typically, isotactic polypropylene is used in both the high and low viscosity components. However, it has been found that the production of foams having regular pore-size is facilitated by including a minor proportion of atactic polypropylene, e.g. from 5 to 40 weight per cent in the foaming composition. The atactic polypropylene (which in general is hexane-soluble) may be added as an additional component or components or it may be incorporated by utilizing low and/or high viscosity components which themselves comprise mixtures of isotactic and atactic polypropylenes. Thus one or both of the low and high viscosity components may comprise 95 to 60 weight per cent of isotactic polypropylene and 40 to 5 weight per cent of atactic polypropylene. Preferably the atactic polypropylene (whether added as such or contained in the respective components) has a molecular weight and dispersivity within the range specified herein for the low and high viscosity components.

The inclusion of atactic polypropylene is believed to contribute to the production of superior foams by increasing the solubility of blowing agents (e.g. fluorocarbons or fluorochlorocarbons) in the foaming compositions.

Generally, suitable blowing agents include volatile liquids (b.p. < 100° C.) which are compatible with other components of the foaming composition. Halocarbons, e.g. fluorocarbons and/or fluorochlorocarbons are preferably used, being readily available in a range of boiling points. Other blowing agents such as halocarbons having at least one hydrocarbon atom within the halocarbon molecule such as ethyl chloride and methylene chloride or mixtures thereof may be used in the method of this invention. Hydrocarbons such as isobutane, n-butane, and isopentane or mixtures thereof may also be used as blowing agents as well as halocarbon/hydrocarbon mixtures. A preferred blowing agent comprises a mixture of monofluorotrichloromethane and tetrafluorodichloromethane, e.g. in a weight ratio 20:80 to 50:50.

The foaming composition may advantageously include one or more nucleating agents, e.g. talc, azodicarbonamide or a mixture of sodium bicarbonate and citric acid.

The effect on foam density, foam quality and foam stability has been assessed using various foaming compositions. Trials were carried out on a pilot extrusion foam line previously used to produce polyethylene and polystyrene foam at up to 200 kg/hr output.

The extrusion line was of the single screw type with a 3.5" (90 mm) extruder diameter with a length 40 times the diameter (40D). The following sections extended successively from the inlet (lengths expressed in terms of multiples of the diameter "D").

| Section | Pitch | Depth | Length |
|---|---|---|---|
| Feed Section | Double | 7 mm | 6 D |
| Feed Section | Normal | 7 mm | 4 D |
| Compression | Normal | Decreasing | 2 D |
| Metering | Normal | 3 mm | 4 D |
| First Mixing | — | — | 2 D |
| Second Mixing | — | — | 2 D |
| Cooling | Intermittent flight | 12 mm | 20 D |

The cooling section would normally be cooled by water circulation when the line is used for extruding polystyrene or polyethylene, but as the melting point of polypropylene is at least 40° K higher, a higher cooling temperature is needed and the cooling unit was changed to thermal oil circulation.

In the Examples which follow, the following components were used in the foaming compositions described:

| Novolen 1300 L | |
|---|---|
| Low viscosity polypropylene consisting mainly of isotactic polypropylene | |
| Wt. average molecular weight | $280 \times 10^3$ |
| No. average molecular weight | $140 \times 10^3$ |
| Dispersivity | 2.0 |
| Content of hexane soluble (wt %) | 15 |

| Novolen 1300 Z | |
|---|---|
| High viscosity polypropylene consisting of isotactic polypropylene | |
| Wt. average molecular weight | $1800 \times 10^3$ |
| No. average molecular weight | $720 \times 10^3$ |
| Dispersivity | 2.5 |
| Content of hexane soluble (wt %) | 15 |

| APP-A | |
|---|---|
| A 50:50 mixture of isotactic polypropylene (Amoco 112) and high dispersivity atactic polypropylene (APP-CR) | |
| Wt. average molecular weight | $280 \times 10^3$ |
| No. average molecular weight | $23 \times 10^3$ |
| Dispersivity | 12 |

| APP-B | |
|---|---|
| A 50:50 mixture of isotactic polypropylene (Amoco 112) and high dispersivity atactic polypropylene (APP-CH) | |
| Wt. average molecular weight | $280 \times 10^3$ |
| No. average molecular weight | $24 \times 10^3$ |
| Dispersivity | 12 |

| APP-CH | |
|---|---|
| High dispersivity atactic polypropylene (Hoechst) | |
| Wt. average molecular weight | $120 \times 10^3$ |
| No. average molecular weight | $11 \times 10^3$ |
| Dispersivity | 11 |

| APP-CR | |
|---|---|
| High dispersivity atactic polypropylene (Hoechst) | |
| Wt. average molecular weight | $220 \times 10^3$ |
| No. average molecular weight | $9 \times 10^3$ |
| Dispersivity | 26 |

| Amoco 112 | |
|---|---|
| Fiber grade isotactic polypropylene grade 123 52112 | |
| Wt. average molecular weight | $270 \times 10^3$ |
| No. average molecular weight | $63 \times 10^3$ |
| Dispersivity | 4 |

| Amoco 103 | |
|---|---|
| Film grade polypropylene grade 123 50103 | |
| Wt. average molecular weight | $310 \times 10^3$ |
| No. average molecular weight | $65 \times 10^3$ |
| Dispersivity | 5 |

| CF 0556 | Nucleating agent (Hydrocerol CF 0556, Boehringer, Ingelheim - mixture of |
|---|---|

| | |
|---|---|
| | sodium bicarbonate and citric acid) |
| TAF 30 | Nucleating agent (a 30:70 mixture of CF 0556 and talc) |
| TAF 50 | Nucleating agent (a 50:50 mixture of CF 0556 and talc) |
| Frigen 11 | Monofluorotrichloromethane. |
| Frigen 12 | Difluorodichloromethane. |
| Frigen 114 | Tetrafluorodichloroethane. |

The following Examples illustrate the invention.

EXAMPLE

Foaming compositions were formulated as follows and foamed on the extrusion line described above.

| Trial 1 | Parts by Weight |
|---|---|
| Novolen 1300 L | 40 |
| Novolen 1300 Z | 5 |
| TAF 30 | 0.05 |
| Frigen 11/114 (30:70) | 7 |

| Trial 2 | Parts by Weight |
|---|---|
| Novolen 1300 L | 40 |
| Novolen 1300 Z | 5 |
| TAF 50 | 0.05 |
| Frigen 11/114 (30:40) | 7 |

| Trial 3 | Parts by Weight |
|---|---|
| Novolen 1300 L | 40 |
| Novolen 1300 Z | 5 |
| CF 0556 | 0.05 |
| Frigen 11/114 (30:40) | 7 |

| Trial 4 | Parts by Weight |
|---|---|
| Novolen 1300 L | 40 |
| Novolen 1300 Z | 5 |
| CF 0556 | 0.05 |
| Frigen 11/114 (50:50) | 7 |

Good foaming was observed in all the trials with an even cell distribution. The foam density in Trials 1 and 2 was in the range 0.17–0.19 g/cm$^3$ and in Trials 3 and 4 in the range 0.14–0.15 g/cm$^3$.

With nucleating agent TAF foams with cell size of above 0.8–1.2 mm diameter were obtained. Using CF 0556 a much finer foam structure was obtained (0.3 mm diameter).

When a 30:70 ratio mixture of Frigen 11/114 was used as a blowing agent, the expansion speed was higher than when a 50:50 ratio was used. The reason for this phenomenon was believed to be the higher solubility of Frigen 11 in atactic polypropylene.

Measurement of Rheological Properties

The rheological properties of the low and high viscosity components (Novolen 1300 L and Novolen 1300 Z) used in the Examples were determined experimentally. Polymer melt viscosities were obtained from experimentally determined plots of measured viscosity versus shear rate as a function of temperature. The melt viscosity and slope for each polymer is given in the following Table. "Slope" is defined as the slope of the tangent line of the viscosity versus shear rate curve at a given temperature and shear rate.

TABLE 1

| Polymer | Shear Rate (sec$^{-1}$) | Melt Viscosity (Poise) at 190° C. | at 220° C. | at 250° C. |
|---|---|---|---|---|
| Novolen 1300 L | 5 | 3.0 × 10$^4$ | 1.7 × 10$^4$ [1] | 9.5 × 10$^3$ [1] |
| | 1000 | 1.4 × 10$^4$ | 1.1 × 10$^3$ | 9.0 × 10$^2$ |
| | 10 | — | — | — |
| | 100 | — | — | — |
| | | at 190° C. | at 220° C. | at 250° C. |
| Novolen 1300 Z | 5 | 1.9 × 10$^5$ | 1.5 × 10$^5$ | 1.2 × 10$^5$ |
| | 1000 | 2.6 × 10$^3$ [1] | 2.2 × 10$^3$ [1] | 9.0 × 10$^2$ |
| | 10 | — | — | — |
| | 100 | — | — | — |

| Polymer | Shear Rate (sec$^{-1}$) | Slope at 190° C. | at 220° C. | at 250° C. |
|---|---|---|---|---|
| Novolen 1300 L | 5 | — | — | — |
| | 1000 | — | — | — |
| | 10 | −0.44 | −0.25 | −0.07 |
| | 100 | −0.65 | −0.62 | −0.56 |
| | | at 190° C. | at 220° C. | at 250° C. |
| Novolen 1300 Z | 5 | — | — | — |
| | 1000 | — | — | — |
| | 10 | −0.78 | −0.77 | −0.69 |
| | 100 | −0.81 | −0.84 | −0.77 |

[1] By extrapolation.

EXAMPLE 2

In this example, the same high viscosity isotactic polypropylene was used as in Example 1 (Novolen 1300 Z). For the low viscosity isotactic polypropylene Amoco grade 123 52112 ("Amoco 112") was used instead of Novolen 1300 L and APP-CR was included as an additional atactic polypropylene component.

Foaming compositions were formulated as follows and foamed on the extrusion line described above.

| Trial One | Parts by Weight | |
|---|---|---|
| Amoco 112 | 30 | |
| APP-CR | 10 | |
| Novolen 1300 Z | 5 | |
| Frigen 114S | 4 | |
| Process Parameters: | pressure at gas injection: | 100 bar |
| | pressure before die: | 25 bar |
| | melt temperature before die: | 176° C. |
| Result: | resin expanded outside the die. Foam sheet produced has a coarse pore structure and thick cell walls. Density is 0.21 g/m$^3$. | |

| Trial Two | Parts by Weight | |
|---|---|---|
| Amoco 112 | 30 | |
| APP-CR | 10 | |
| Novolen 1300 Z | 5 | |
| Talc | 0.1 | |
| Frigen 114 | 4 | |
| Process Parameters: | pressure at gas injection: | 120 bar |
| | pressure before die: | 37 bar |
| | melt temperature before die: | 169° C. |
| Result: | resin expanded outside the die. Foam sheet produced has middle cell size of 0.5 mm. Density is 0.21 g/m$^3$. | |

| Trial Three | Parts by Weight | |
|---|---|---|
| Amoco 112 | 30 | |
| APP-CR | 10 | |
| Novolen 1300 Z | 5 | |
| CF 0556 | 0.3 | |
| Frigen 114S | 4 | |
| Process Parameters: | pressure at gas injection: | 80 bar |
| | pressure before die: | 22 bar |
| | melt temperature before die: | 158° C. |
| Result: | resin expanded outside the die, but the foam collapsed in parts. Foam sheet produced shows a very fine cell. Density is 0.19 g/m$^3$. | |

| Trial Four | Parts by Weight |
|---|---|
| Amoco 112 | 30 |
| APP-CR | 10 |
| Novolen 1300 Z | 5 |

-continued

| | | |
|---|---|---|
| | Azodicarbonamide | 0.1 |
| | Frigen 114S | 4 |
| Process Parameters: | pressure at gas injection: | 130 bar |
| | pressure before die | 34 bar |
| | melt temperature before die: | 172° C. |
| Result: | resin expanded outside the die. Foam sheet produced looks very good. Cell size and cell distribution were very uniform, as was sheet thickness. Density is 0.15 g/m³. | |

These results demonstrate that foam produced without a nucleating agent has a relatively coarse pore structure. By including nucleating agents, for example talc or sodium bicarbonate, the foam becomes much finer, the precise texture depending on the nucleating agent used.

EXAMPLE 3

In this example, the same low viscosity isotactic polypropylene was used in Example 2. High viscosity isotactic polypropylene was omitted in Trials 1, 2 and 3, while in Trials 4 and 6 a high viscosity isotactic polypropylene having a low dispersivity was used. The high viscosity component used in Trials 5 and 7 had a medium to high dispersivity. Foaming was carried out using gas injection alone rather than with a blowing agent.

| Trial One | | Parts by Weight |
|---|---|---|
| Amoco 112 | | 35 |
| APP-CR | | 10 |
| Silicon Oil | | 0.2 |
| CF 0556 | | 0.2 |
| Process Parameters: | pressure at gas injection: | 25 bar |
| | pressure before die: | 18 bar |
| | melt temperature before die: | 152° C. |
| Result: | good resin dispersion. The resin expanded in the die and the foam collapsed outside the die. | |

| Trial Two | | Parts by Weight |
|---|---|---|
| Amoco 112 | | 41 |
| APP-CR | | 9 |
| Silicon Oil | | 0.2 |
| CF 0556 | | 0.2 |
| Process Parameters: | pressure at gas injection: | 25 bar |
| | pressure before die: | 20 bar |
| | melt temperature before die: | 155° C. |
| Result: | same as Trial One. | |

| Trial Three | | Parts by Weight |
|---|---|---|
| Amoco 112 | | 40 |
| APP-CR | | 10 |
| Silicon Oil | | 0.2 |
| CF 0556 | | 0.2 |
| Process Parameters: | pressure at gas injection: | 30 bar |
| | pressure before die: | 20 bar |
| | melt temperature before die: | 155° C. |
| Result: | same as Trial One. | |

| Trial Four | | Parts by Weight |
|---|---|---|
| Amoco 112 | | 20 |
| APP-CR | | 5 |
| Novolen 1300 Z | | 25 |
| Silicon Oil | | 0.2 |
| CF 0556 | | 0.2 |
| Process Parameters: | pressure at gas injection: | 90 bar |
| | pressure before die: | 62 bar |
| | melt temperature before die: | 165° C. |
| Result: | resin expansion took place outside the die. The foam remained stiff. | |

| Trial Five | | Parts by Weight |
|---|---|---|
| Amoco 112 | | 25 |
| Amoco 103 | | 25 |
| APP-CR | | 5 |
| Silicon Oil | | 0.2 |
| CF 0556 | | 0.2 |
| Process Parameters: | pressure at gas injection: | 30 bar |
| | pressure before die: | 28 bar |
| | melt temperature before die: | 158° C. |
| Result: | expansion stability is slightly better than the first 3 trials. | |

| Trial Six | | Parts by Weight |
|---|---|---|
| Amoco 112 | | 25 |
| Novolen 1300 Z | | 25 |
| APP-CR | | 5 |
| Silicon Oil | | 0.2 |
| CF 0556 | | 0.2 |
| Process Parameters: | pressure at gas injection: | 100 bar |
| | pressure before die: | 65 bar |
| | melt temperature before die: | 168° C. |
| Result: | as good as Trial Four. | |

| Trial Seven | | Parts by Weight |
|---|---|---|
| Amoco 112 | | 40 |
| APP-CR | | 10 |
| EPDM (Type and Supplier unknown) | | 20 |
| Silicon Oil | | 0.2 |
| CF 0556 | | 0.2 |
| Process Parameters: | pressure at gas injection: | 30 bar |
| | pressure before die: | 25 bar |
| | melt temperature before die: | 145° C. |
| Result: | the resin expanded in the die. The foam collapsed outside the die. | |

The foams produced in Trials 4 and 6 were dimensionally stable and had densities of 0.06–0.08 g/m³. The foams were microcellular and had good impact resistance. This data shows that the use of a high viscosity component (Novolen 1300 Z) is necessary to ensure that the viscosity of the foaming composition is high enough for pressure to be built up in the extruder which is higher than the gas pressure produced by volatilization of the blowing agent.

The results indicate that for the production of suitable low density foam, the foaming composition should have a high viscosity component and contain an isotactic polypropylene having a low dispersivity. The pressure in the gas injection zone is preferably above 50 bar and the pressure before the die about 35 bar.

EXAMPLE 4

Experiments were carried out to assess the properties of selected fluorochlorocarbon blowing agents. Gas pressure generated by the blowing agent is important because if the pressure is too high in relation to the melt viscosity, poor foam may result. This is believed to be because if the surface tension of the cell walls is lower than the pressure of the trapped gas, the cell walls will break causing the foam to collapse.

The pressure generated under identical conditions by three representative blowing agents was as follows:
Gas pressure (p) at $t=160°$ C., $v=0.01$ m³/kg
Frigen 11 = 20 bar
Frigen 12 = 25 bar
Frigen 114 = 17 bar Since Frigen 114 produced a lower gas pressure than Frigen 11 and 12 at a temperature of 160° C., Frigen 114 was used as foaming agent for most trials.

Further investigations were made regarding the solution properties of fluorochlorocarbon blowing agents in isotactic/atactic polypropylene mixtures. In the experiments, the polymers were contacted with the respective blowing agents and the weight increases measured. The percentage increase in weight is an indication of the degree of solubility of the blowing agents in the polymer blends.

The following results in weight increases were obtained:

|  | 50% APP/50% IPP (MFI = 30) | |
|---|---|---|
|  | 23° C. | 90° C. |
| Frigen 11 | 69% | 77% |
| Frigen 12 | 34% | 40% |
| Frigen 114 | 20% | 26% |
|  | 15% APP/85% IPP (MFI = 5) | |
|  | 23° C. | 90° C. |
| Frigen 11 | 57% | 129% |
| Frigen 12 | 26% | 42% |
| Frigen 114 | 6% | 26% |
|  | 100% IPP (MFI = 10) | |
|  | 23° C. | 90° C. |
| Frigen 11 | 25% | 20% |
| Frigen 12 | 15% | 13% |
| Frigen 114 | 3% | — |

APP = atactic polypropylene
IPP = isotactic polypropylene
MFI = melt flow index

The figures show that atactic polypropylene has good solution properties with Frigen 11.

Based on these findings the following gas mixtures were selected: Frigen 114/11 in a ratio of 70/30 and 50/50.

These mixtures improved the foaming properties compared to pure 114 in so far as gradual expansion took place, forming evenly foamed cells.

What is claimed is:

1. A method of producing a foamed product having a density less than 0.2 g/cm$^3$ which comprises foaming a composition comprising a major proportion of a low viscosity polypropylene component having a melt viscosity (at 190° C. and a shear rate of 1000 sec$^{-1}$) of less than $2 \times 10^3$ poise and a minor proportion of a high viscosity polypropylene component having a melt viscosity (at 190° C. and a shear rate of 1000 sec$^{-1}$) of greater than $2.5 \times 10^3$ poise.

2. The method according to claim 1 wherein the low viscosity polypropylene component has a weight average molecular weight in the range from 100,000 to 500,000.

3. The method according to claim 1 wherein the low viscosity polypropylene component has a weight average molecular weight in the range from 200,000 to 350,000.

4. The method according to claim 1 wherein the low viscosity polypropylene component has a dispersivity less than 5.

5. The method according to claim 1 wherein the low viscosity polypropylene component has a dispersivity of from 2 to 5.

6. The method according to claim 1 wherein the high viscosity polypropylene component has a molecular weight greater than 500,000.

7. The method according to claim 6 wherein the high viscosity polypropylene component has a molecular weight in the range 1,000,000 to 2,000,000.

8. The method according to claim 1 wherein the high viscosity polypropylene component has a dispersivity of less than 5.

9. The method according to claim 8 wherein the high viscosity polypropylene component has a dispersivity in the range from 2 to 5.

10. The method according to claim 1 wherein said composition comprises from 70 to 90 weight per cent of said low viscosity polypropylene component and from 30 to 10 weight per cent of said high viscosity polypropylene component based on the total weight of said low and high viscosity polypropylene components.

11. The method according to claim 1 wherein said composition comprises from 5 to 40 weight per cent of atactic polypropylene based on the total weight of the composition.

12. The method according to claim 11 wherein the composition is formed by mixing high and low viscosity polypropylene components each comprising from 60 to 95 weight per cent isotactic polypropylene and from 40 to 5 weight per cent atactic polypropylene.

13. The method according to claim 12 wherein the atactic polypropylene contained in the low viscosity polypropylene component has a weight average molecular weight in the range from 100,000 to 500,000 and a dispersivity less than 5 and the atactic polypropylene contained in the high viscosity polypropylene component has a weight average molecular weight greater than 500,000 and a dispersivity less than 5.

14. The method according to claim 1 wherein the composition comprises 88 weight per cent of a low viscosity polypropylene component comprising a polypropylene having a weight average molecular weight of 280,000 and a dispersivity of 2 and 12 weight per cent of a high viscosity polypropylene component comprising a polypropylene having a weight average molecular weight of 1,800,000 and a dispersivity of 2.5, and wherein the low viscosity polypropylene component and the high viscosity polypropylene component each comprises 85 weight per cent isotactic polypropylene and 15 weight per cent atactic polypropylene.

15. The method according to claim 1 wherein the foaming composition includes a blowing agent.

16. The method according to claim 15 wherein the blowing agent comprises a fluorochlorocarbon or fluorochlorocarbon mixture.

17. The method according to claim 16 wherein said mixture comprises a mixture of monofluorotrichloromethane and tetrafluorodichloroethane.

18. The method according to claim 17 wherein the weight ratio of monofluorotrichloromethane and tetrafluorodichloroethane is in the range of 20:80 to 50:50.

19. The method according to claim 1 wherein the foaming composition contains a nucleating agent comprising a mixture of sodium bicarbonate and citric acid or a mixture of sodium bicarbonate and citric acid with talc.

20. A method of producing a foamed product having a density less than 0.2 g/cm$^3$ which comprises foaming a composition comprising a major proportion of a low viscosity polypropylene component having a weight average molecular weight in the range from 100,000 to 500,000 and a minor proportion of a high viscosity polypropylene component having a weight average molecular weight greater than 500,000.

21. The method of claim 20 wherein the foaming is carried out by extrusion.

22. The method of claim 20 wherein the low viscosity polypropylene component is present in the amount of 70 to 90 weight percent of the composition and the high viscosity polypropylene component is present in the amount of 10 to 30 weight percent of the composition.

23. The method of claim 22 wherein the low viscosity polypropylene component has a dispersivity less than 5.

24. The method of claim 22 wherein the high viscosity polypropylene component has a dispersivity of less than 5.

25. The method of claim 1 wherein the foaming is carried out by extrusion.

* * * * *

UNITED STATES PATENT AND TRADEMARK OFFICE
CERTIFICATE OF CORRECTION

PATENT NO. : 4,940,736               Page 1 of 2
DATED      : July 10, 1990
INVENTOR(S): Josef Alteepping and Juergen P. Nebe It is certified that error appears in the above-indentified patent and that said Letters Patent is hereby corrected as shown below:

| Column | Line |
|---|---|
| 2 | line 26, "0.2 g/cm$^3$," should read --0.2 g/cm$^3$,-- |
| 2 | line 33, "2.5 x 103" should read --2.5 x 10$^3$-- |
| 2 | line 45, "weight per cent" should read --weight percent-- |
| 2 | line 47, "weight per cent" should read --weight percent-- |
| 3 | line 4, "($\overline{MHD}w$)" should read --($\overline{M}w$)-- |
| 3 | line 5, "($\overline{MHD}n$)" should read --($\overline{M}n$)-- |
| 3 | lines 14-15, "per cent" should read --percent-- |
| 3 | line 22, "per cent" should read --percent-- |
| 3 | line 23, "per cent" should read --percent-- |
| 5 | line 12, "EXAMPLE" should read --EXAMPLE 1-- |
| 7 | line 5, "die 34" should read --die: 34-- |
| 9 | line 66, "per cent" should read --percent-- |
| 9 | line 68, "per cent" should read --percent-- |

UNITED STATES PATENT AND TRADEMARK OFFICE
CERTIFICATE OF CORRECTION

PATENT NO. : 4,940,736
DATED : 4-18-91
INVENTOR(S) : Josef Alteepping and Juergen P. Nebe It is certified that error appears in the above-indentified patent and that said Letters Patent is hereby corrected as shown below:

Column 10, lines 4, 10, 11, 21, 24 and 30, "per cent" should read --percent--.

Signed and Sealed this

Twenty-ninth Day of June, 1993

Attest:

MICHAEL K. KIRK

Attesting Officer

Acting Commissioner of Patents and Trademarks